US012746543B2

(12) United States Patent
Wang

(10) Patent No.: US 12,746,543 B2
(45) Date of Patent: Sep. 29, 2026

(54) MICROFLUIDIC DETECTION STRIP CHIP AND PREPARATION AND METHOD THEREOF

(71) Applicant: Xiamen Brana Design Co., Ltd., Xiamen (CN)

(72) Inventor: Zhongtang Wang, Xiamen (CN)

(73) Assignee: Xiamen Brana Design Co., Ltd., Xiamen (CN)

( * ) Notice: Subject to any disclaimer, the term of this patent is extended or adjusted under 35 U.S.C. 154(b) by 770 days.

(21) Appl. No.: 18/100,527

(22) Filed: Jan. 23, 2023

(65) Prior Publication Data

US 2023/0234047 A1 Jul. 27, 2023

(51) Int. Cl.
*B01L 3/00* (2006.01)
*G01N 21/78* (2006.01)

(52) U.S. Cl.
CPC ......... *B01L 3/5023* (2013.01); *B01L 2200/16* (2013.01); *B01L 2300/069* (2013.01); *B01L 2300/0825* (2013.01); *B01L 2400/0406* (2013.01); *G01N 21/78* (2013.01)

(58) Field of Classification Search
CPC ............... B01L 3/5023; B01L 2200/16; B01L 2300/069; B01L 2300/0825; B01L 2400/0406; B01L 2300/0681; B01L 2300/0864; B01L 3/502738; G01N 21/78; G01N 2021/0325; G02N 21/78
See application file for complete search history.

(56) References Cited

U.S. PATENT DOCUMENTS

| | | | | |
|---|---|---|---|---|
| 3,635,677 A * | 1/1972 | Drake, Jr. | G01N 31/22 | 436/178 |
| 2006/0018790 A1* | 1/2006 | Naka | G01N 21/03 | 422/400 |
| 2024/0050943 A1* | 2/2024 | Abbaspourrad | G01N 21/6428 | |

FOREIGN PATENT DOCUMENTS

| | | | |
|---|---|---|---|
| WO | WO-2005083423 A2 * | 9/2005 | G01N 33/566 |

* cited by examiner

*Primary Examiner* — Melvin C. Mayes
*Assistant Examiner* — Sophia Y Lyle
(74) *Attorney, Agent, or Firm* — David & Raymond Patent Firm; Raymond Y Chan

(57) ABSTRACT

A microfluidic detection strip chip for multiple indicator detection of microsample and method thereof are disclosed. The microfluidic detection strip chip includes a substrate, a plurality of microfluidic pipes, and a plurality of reagent blocks, the microfluidic pipes and the reagent blocks arranged in a lattice are arranged on the substrate for detection of enzyme, chemistry, protein, polypeptide, amino acid, nucleic acid, and exocrine components in samples. The microfluidic pipes and reagent blocks are made using micro processing technology, and the reagent blocks are printed to the lattice array grooves constructed by the substrate and microfluidic pipes, thus realizing an analysis and detection effect of multiple indicators of microsample.

6 Claims, 15 Drawing Sheets

MICROFLUIDIC DETECTION STRIP CHIP AND PREPARATION AND METHOD THEREOF

CROSS REFERENCE OF RELATED APPLICATION

This application is a non-provisional application that claims the benefit of priority under 35 U.S.C. § 119(e) to a provisional application, application number 202210075783.4, filed Jan. 22, 2022, which is incorporated herewith by reference in its entirety.

BACKGROUND OF THE PRESENT INVENTION

Field of Invention

The application relates to a field of medical detection consumables, and more particularly to a microfluidic detection strip chip, its preparation process and method thereof.

Description of Related Arts

Dry chemical test strips are widely used in medical detection. Using printing technology or ink-jet printing technology to make integrated test strips can achieve simultaneous detection of hundreds of indicators on one test strip (No. CN112362648A). Compared with conventional immersion or coating methods, using spray technology to soak test strips can significantly reduce sample consumption (No. CN112505027A), however, the spraying technology is still unable to meet the demand for more indicators of micro-sample detection.

Theoretically, microfluidic technology can accurately infiltrate micro samples or reagents into each reagent block of the strip, but a three-dimensional structure of microfluidic pipe is complex, and the strip substrate is thick and heavy, resulting in an high prices, which is not conducive to the popularization of microfluidic technology dry chemical strip in medical detection.

As mentioned above, a planar structure microfluidic pipe is constructed and bonded to the test strip substrate. By changing a valve size, a flow rate and flow direction of a sample or reagent into a reagent block are controlled, and a point position of the reagent block on an integrated test strip is set according to a target molecular weight of detected index, so as to achieve a microfluidic technical scheme of accurately wetting the integrated test strip reagent block with microsample or reagents, to achieve a technical effect of detecting more indicators with low-cost microfluidic test strip chip.

SUMMARY OF THE PRESENT INVENTION

The invention is advantageous in that it provides a microfluidic detection trip chip and manufacturing process and application method thereof, wherein a constructed planar structure micro tube is bonded to a substrate, and a reagent block is printed on the substrate to produce a low-cost microfluidic strip chip. In the chip, a flow rate and flow direction of samples or reagents entering the reagent block are controlled by changing a size of a micro tube valve, and a point position of the reagent block on the substrate is accurately set according to a target molecular weight of an indicator detected by the reagent block, so as to precise control sample or reagent wetting the reagent block.

According to a preferred embodiment of the present invention, the foregoing and other objects and advantages are attained by a microfluidic detection strip chip configured for multi indicator detection of micro samples, comprising a substrate, a plurality of microfluidic pipes, and a plurality of reagent blocks.

The microfluidic pipe can be bonded to a surface of the substrate configured to control a flow rate and flow direction of liquid samples or reagents. The microfluidic pipe comprises a sample adding component, a first port, a capillary network, and a plurality of second ports.

The sample adding component is connected with the first port, the first port is connected with the capillary network, the capillary network is connected with the second port, and the capillary network forms a plurality of grooves arranged in a lattice pattern on the substrate, each groove is connected with the capillary net through a second port.

The reagent block is arranged in the groove formed by the substrate and the microfluidic pipe. The reagent block comprises a reaction part and a waste liquid absorption part for sample and/or reagent color reaction.

Further, the sample adding component comprises a sample hole, and the sample hole comprises a first interface configured to connect a syringe for filling liquid samples.

Further, the sample hole comprises a first filter screen configured to filter large particle components in a liquid sample.

Preferably, the sample adding component comprises two or more sample holes configured to fill different samples of same individual or same type of samples of different individuals.

Further, the sample adding component comprises an extension tube, and a proximal end of the extension tube can be connected to the first interface, and a distal end of the extension tube can be pluggable connected to the first port.

Further, the sample adding component comprises a reagent hole, the reagent hole comprises a second interface and a second extension tube configured to connect a syringe and add reagent, wherein a near end of the second extension tube is connected to the second interface, and a far end of the second extension tube is pluggable connected to the first port.

Further, the sample adding component comprises an elastic fluid reservoir configured to store liquid samples or reagents, and slowly and continuously inject liquid samples or reagents into the capillary network through the first port. The elastic fluid reservoir comprises an injection kettle, a capsule body, and a valve, wherein the injection kettle is configured to connect a syringe needle and the capsule body, and the capsule body is pluggable connected with the first port through the valve.

Further, the microfluidic pipeline comprises a plurality of micro valves, the micro valves are arranged between the second port and the groove as a one-way valve configured to control the flow direction of liquid samples or reagents.

Preferably, the second port comprises a first stage second port, a second stage second port, a third stage second port, and a last stage second port. An opening size of the first stage second port is the smallest configured to connect the capillary network and the groove near the first port. The opening size of the last stage second port is the largest configured to connect the capillary network and the groove far away from the first port.

Further, the reagent block comprises a filter component, the filter component is arranged between the reaction component and the second port configured to filter large particle components in a test sample or components interfere with a chromogenic reaction.

Preferably, the reagent block is set in the groove constructed between the substrate and the microfluidic pipe, which position in the groove on the substrate depends on a target molecular weight of an indicator detected by the reagent block. The reagent block for detecting large target molecular weight of the indicator can be set in the groove near the first port area, and the reagent block for detecting small target molecular weight of the indicator can be set in the groove far away from the first port area.

In accordance with another aspect of the invention, the present invention provides a preparation method of a microfluidic detection strip chip, comprising the following steps:

- S1: Design a microfluidic detection strip chip, including designing a microfluidic pipe diagram, selecting types of reagent blocks, and arranging the reagent block on a substrate.
- S2: Make microfluidic pipes and reagent blocks with micro process.
- S3: Bond the microfluidic pipe to a substrate to form a capillary network which forms a groove lattice on the substrate.
- S4: Print the reagent blocks to the groove lattice on the substrate.
- S5: Install an extension tube and elastic fluid reservoir, and place into a detection box.

In accordance with another aspect of the invention, the present invention further provides a usage of a microfluidic detection strip chip, comprising the following steps.

- S1: Select a microfluidic detection strip chip.
- S2: Fill a sample.
- S3: Fill a reagent.
- S4: Control a reaction condition.
- S5: Scan and detect to obtain a result.

The combination of microfluidic technology and low-cost and easy to popularize integrated detection paper technology enables liquid samples or reagents to soak s reagent block in a precise "infiltration irrigation" way, thus replacing the existing "sprinkler irrigation" or "flood irrigation" way, achieving an effect that hundreds of indicators can be detected by micro samples.

Compared with the existing integrated detection paper technology, the precise "infiltration irrigation" way can ensure that each reagent block can be fully soaked. Therefore, more number and types of reagent blocks can be integrated on a detection paper strip, making it possible to detect thousands of indicators on a detection paper strip.

The constructed "planar structure" microchannel replaces the existing "three-dimensional structure" microchannel, simplifies the process of making microfluidic tubes, reduces the production cost, and the substrate can be made more thinner, which is conducive to the popularization of microfluidic detection strip chips.

Compared with the prior art, a flow rate and direction of sample or reagent entering the reagent block can be accurately controlled without additional energy by changing a capillary diameter of the micro pipe, a size of an outlet port, and/or setting a one-way micro valve.

A position of the reagent block on the integrated detection paper strip is set according to a size of a target molecular weight of an indicator detected, and a laminar flow effect of the microchannel can be used, so as to reduce a time difference between target molecules with different molecular weights in a liquid sample entering the reagent block, thus shortening detection time.

Compared with the existing integrated detection paper technology, the syringe interface, extension tube and elastic fluid reservoir are convenient for users to operate accurately, avoid waste of samples or reagents, and reduce a risk of aerosol pollution.

These and other objectives, features, and advantages of the present invention will become apparent from the following detailed description, the accompanying drawings, and the appended claims.

BRIEF DESCRIPTION OF THE DRAWINGS

In order to more clearly explain the technical solution of the embodiments of the present application, the following will briefly introduce the drawings needed to be used in description of the embodiments. Obviously, the drawings in the following description are only some embodiments of the present application. For those skilled in the art, other drawings can be obtained from these drawings without any creative effort.

In addition, the attached drawings are only schematic diagrams of the application and are not necessarily drawn to scale. The same reference numerals in the figures represent the same or similar parts, and therefore repeated description of them will be omitted. Some block diagrams shown in the figures are functional entities, which do not necessarily correspond to physically or logically independent entities. These functional entities can be implemented in one or more hardware modules or component combinations.

Figure 1:
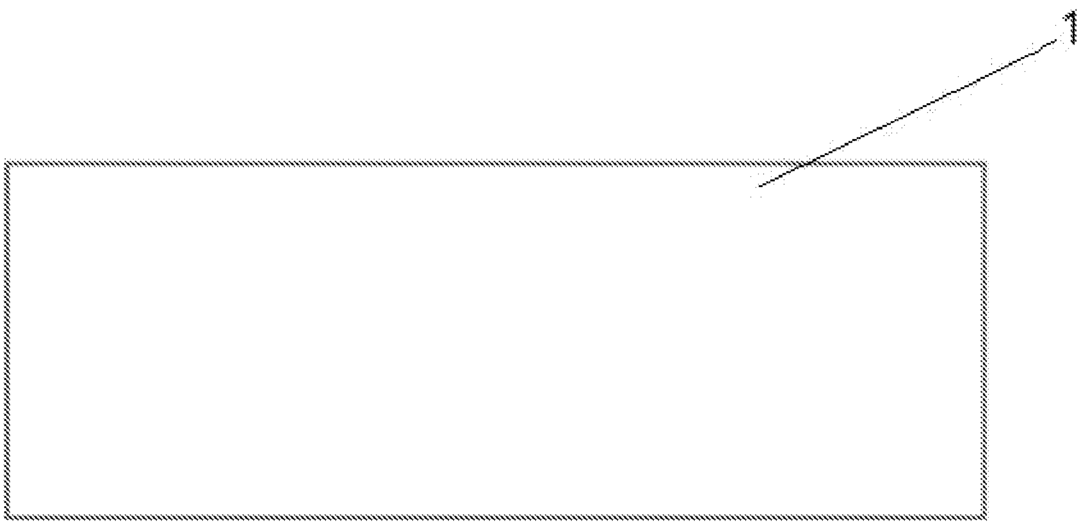
FIG. 1 is a structural diagram of a substrate according to a preferred embodiment of the present invention.

The drawings, described above, are provided for purposes of illustration, and not of limitation, of the aspects and features of various examples of embodiments of the invention described herein. The drawings are not intended to limit the scope of the claimed invention in any aspect. For simplicity and clarity of illustration, elements shown in the drawings have not necessarily been drawn to scale and the dimensions of some of the elements may be exaggerated relative to other elements for clarity.

DETAILED DESCRIPTION OF THE PREFERRED EMBODIMENT

In order to make the purpose, technical solution and advantages of the application more clearly, the application is further described in detail below in combination with embodiments. It should be understood that the specific embodiments described herein are only used to explain the application, not to limit the application.

It should be noted that the up, down, left, right, far, near, front, back, positive and negative directions in this embodiment are only relative concepts to each other or refer to the normal use state of the product, and should not be considered as restrictive.

Referring to FIGS. 1 to 12, a microfluidic detection strip chip according to a preferred embodiment of the present invention comprises a substrate 1, a microfluidic pipe 2, and a plurality of reagent blocks 3 configured to detect multi-indicators of micro samples.

As shown in FIG. 1, according to the preferred embodiment of the present invention, the substrate 1 can be a rectangular strip sheet, which is configured to carry the microfluidic pipe 2 and the reagent blocks 3, and is combined into a complete microfluidic detection strip chip. It should be noted that the substrate 1 can also be circular, square or any other shape. A thickness, width and length of the substrate 1 can be set as required. The substrate 1 can be usually made of polymer materials with good elasticity and toughness, and can also be made of other materials.

As shown in FIGS. 2 to 8, according to the preferred embodiment of the present invention the microfluidic pipe 2 can comprise a capillary network 21, a plurality of first ports 24, a plurality of grooves 23, a plurality of second ports 22, an interface 25, an extension tube 26, a filter screen 27 and an elastic fluid reservoir 28.

Figure 2:
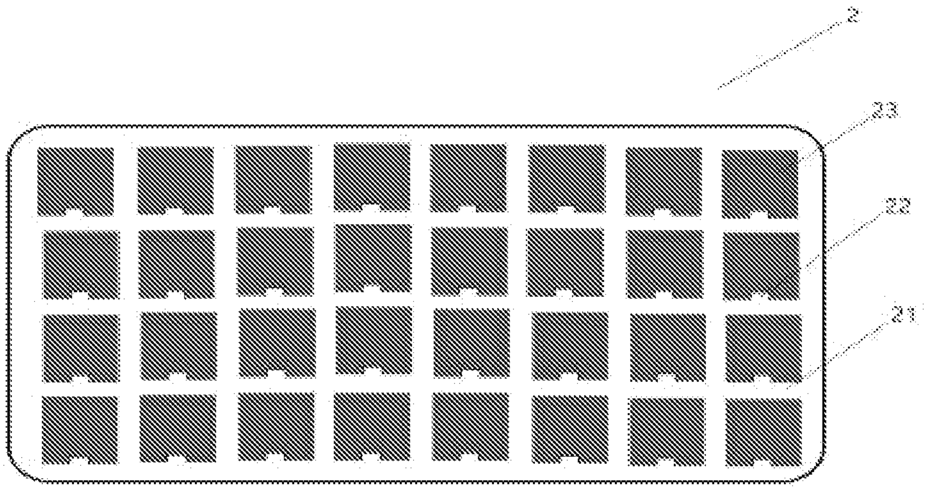
FIG. 2 is a structural diagram of a microfluidic pipe according to the above preferred embodiment of the present invention.

As shown in FIG. 2, according to the preferred embodiment of the present invention, the microfluidic pipe 2 can comprise a capillary network 21. The capillary networks 21 can be connected with each other. The capillary network 21 can form a space around the groove 23, and the capillary network 21 can be connected with the space of the groove 23 through the second port 22, so that a liquid flowing in the capillary network 21 enters the space of the groove 23 through the second port 22. It should be noted that a shape of capillary network 21 can be a rectangular, square, circular or any other shape, and a pipe diameter can be inconsistent. The pipe diameter is usually between 100 μm and 800 μm, and a wall thickness is usually not more than 500 μm. The capillary network 21 can be usually made of polymer materials with good elasticity and toughness, and can also be made of other materials. In addition, the space shape of the groove 23 can be a rectangular, square, round or any other shape to match the shape and size of the reagent blocks 3.

Figure 3:
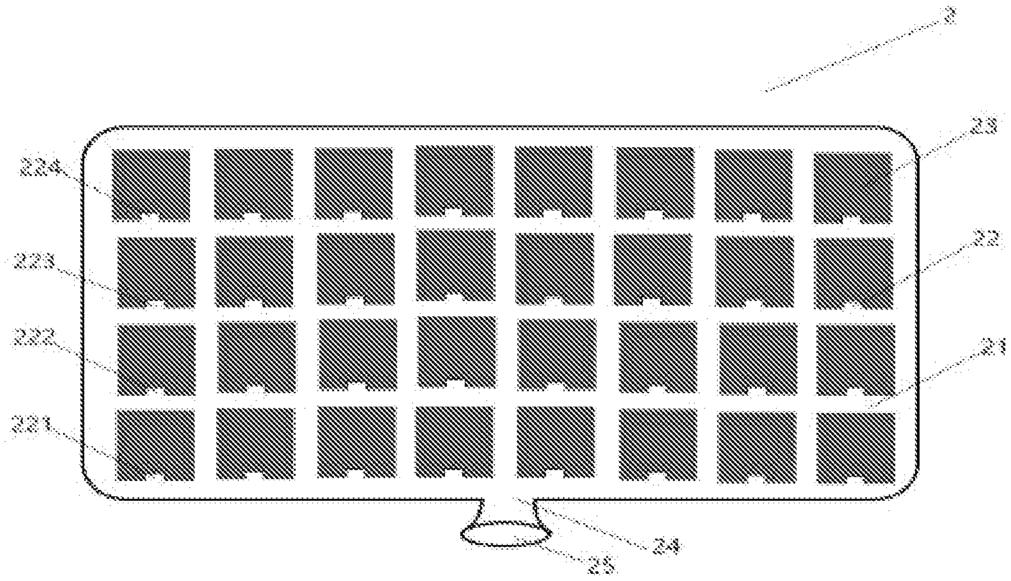
FIG. 3 is a structural diagram of a microfluidic pipe including a sample hole according to the above preferred embodiment of the present invention.

As shown in FIG. 3, according to the preferred embodiment of the present invention, the microfluidic pipe 2 can comprise a capillary network 21, a plurality of first port 24, a plurality of groove 23, a plurality of second port 22, and an interface 25. The interface 25 is configured to connect a syringe, and the syringe can inject liquid samples or reagents through the interface 25 and the first port 24 into the capillary network 21, and then the samples or reagents can enter the groove 23 through a plurality of second ports 22.

In addition, the second port 22 can comprise a first stage second port 221, a second stage second port 222, a third stage second port 223, and a last stage second port 224. Among them, an opening size of the first stage second port 221 is the smallest, which is set near the first port 24, when a syringe injects liquid samples or reagents through the capillary network 21 and the second port 22 into the groove 23, the liquid samples or reagents can flow into the groove 23 at a slowest speed. The opening sizes of the second stage second port 222 and the third stage second port 223 can gradually increase, which can be set in a middle area of the capillary network 21, when the syringe pushes liquid samples or reagents through the capillary network 21 and the second port 22 to enter the space of the groove 23, and the liquid samples or reagents can flow into the groove 23 at an increased speed accordingly. The opening size of the last stage second port 224 is the largest, which is set in an area far from the first port 24, when the syringe pushes liquid samples or reagents through the capillary network 21 and the second port 22 to enter the space of the groove 23, the liquid samples or reagents can flow into the groove 23 at a faster speed. Thus, through different opening sizes of the second port 22, the liquid sample or reagent injected by the syringe can almost synchronously flow from the first port 24 into the capillary network 21 and into the groove 23. It should be noted that the second port 22 can also be set with a forth or more stages as required.

In addition, the interface 25 and the first port 24 can be set at a lower end of the capillary network 21, or at an upper end of the capillary network 21, or at a left end, or at a right end, or at any area between the capillary network 21. Accordingly, a position of the first stage second port 221, the second stage second port 222, the third stage second port 223, and the last stage second port 224 need to be changed.

It can be understood that when it is need to fill a liquid sample or reagent to the groove 23 through the capillary network 21 and the second port 22 at a fastest speed, a position of the groove 23 can be set in an area closest to the first port 24, and a larger pipe diameter of the capillary network 21 and a largest opening of the second port 22 can be made. On the contrary, when it is need to fill a liquid sample or reagent to the groove 23 through the capillary network 21 and the second port 22 at a slowest speed, the position of the groove 23 can be set in the area farthest from the first port 24, and a smaller pipe diameter of the capillary network 21 and a smallest opening of the second port 22 can be made.

Figure 4:
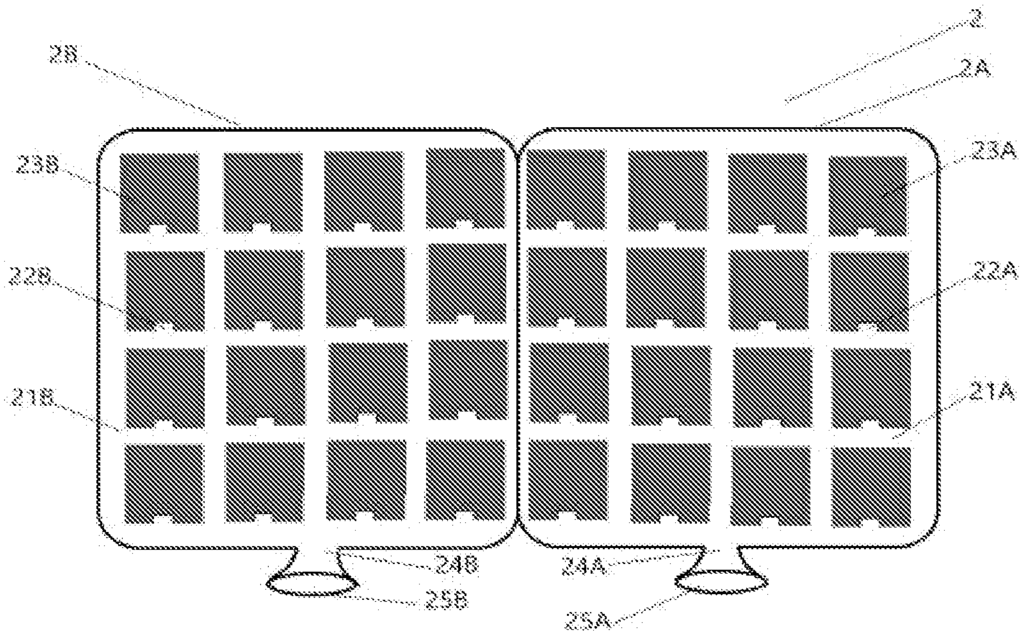
FIG. 4 is a structural diagram of a microfluidic pipe including two sample holes according to the above preferred embodiment of the present invention.

As shown in FIG. 4, according to the preferred embodiment of the present invention, the microfluidic pipe 2 can comprise a microfluidic pipe 2A and a microfluidic pipe 2B, the microfluidic pipe 2A and the microfluidic pipe 2B can be two relatively independent pipe systems configured to make two different types of microfluidic detection strip chips. The microfluidic pipe 2A can comprise a capillary network 21A, a plurality of first ports 24A, a plurality of grooves 23A, a plurality of second ports 22A, and an interface 25A. The microfluidic pipe 2B can comprise a capillary network 21B, a plurality of first ports 24B, a plurality of grooves 23B, a plurality of second ports 22B, and an interface 25B. It can be understood that the microfluidic pipe 2 can include three or more sets of pipe systems as required to make three or more different types of microfluidic strip chips. Each set of pipe system can be a same or different in shape, size and structure. In addition, the second port 22A and the second port 22B can also be set to different size categories. The interface 25 and the first port 24 can be set at a lower end of the capillary network 21, or at any area of the capillary network 21.

Figure 5A:
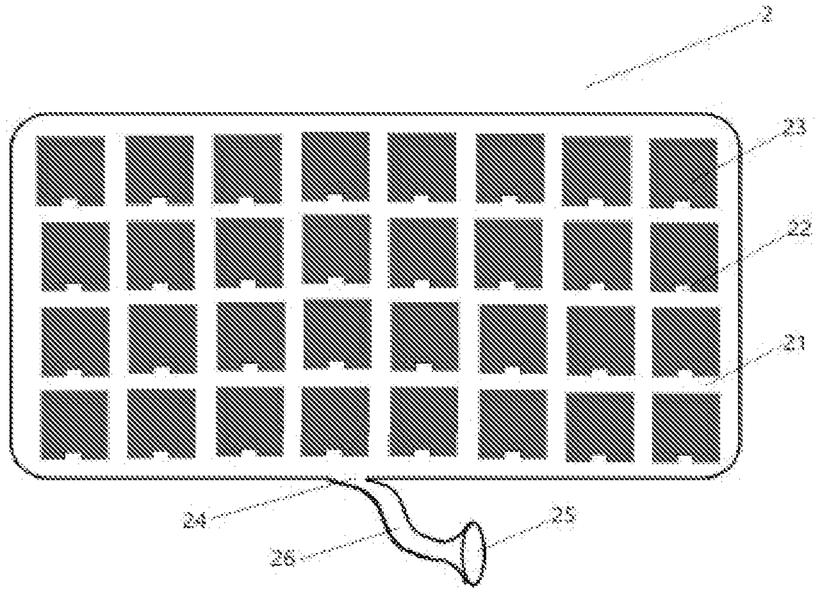
FIG. 5A is a structural diagram of a microfluidic pipe including a sample hole and an extension tube according to the above preferred embodiment of the present invention.
Figure 5B:
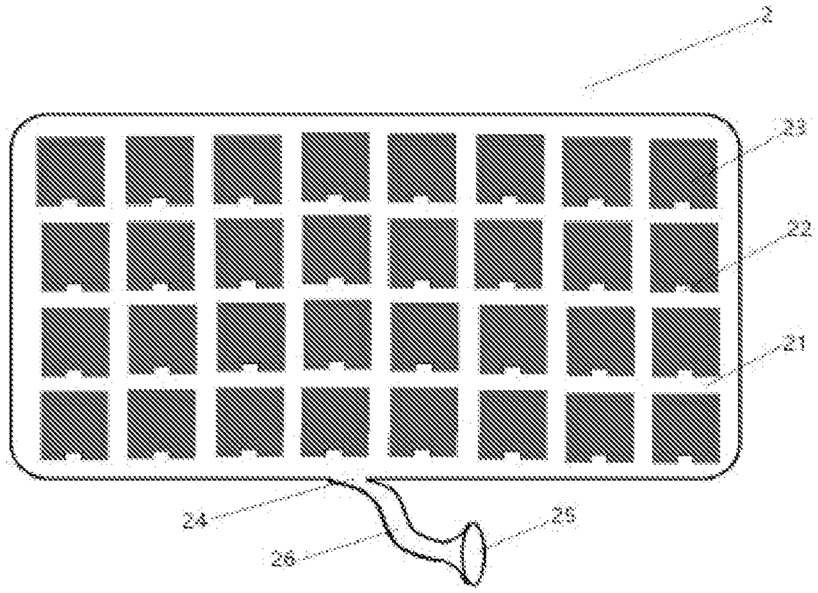
FIG. 5B is a structural diagram of a microfluidic pipe including a sample hole, an extension tube and a valve according to the above preferred embodiment of the present invention.

As shown in FIG. 5A, according to the preferred embodiment of the present invention, the microfluidic pipe 2 can comprise a capillary network 21, a plurality of first ports 24, a plurality of grooves 23, a plurality of second ports 22, an interface 25 and an extension tube 26, wherein the interface 25 is configured to connect a syringe, a near end of the extension tube 26 can be fixedly connected with the interface 25, and a far end of extension tube 26 can be pluggable connected with the first port 24. When liquid samples or reagents need to be added, the extension tube 26 and the interface 25 can be inserted into the first port 24 to implement the filling operation. After the filling operation, the extension tube 26 and the interface 25 can be pulled out from the first port 24. In addition, as shown in FIG. 5B, another microfluidic pipe 2 in the preferred embodiment of the present invention can comprise a capillary network 21, a plurality of first ports 24, a plurality of grooves 23, a plurality of second ports 22, an interface 25, an extension tube 26, and a valve 241. The valve 241 can be arranged at a near end of the first port 24, the valve 241 can be fixedly connected with the first port 24, and the valve 241 also can be pluggable connected with the extension tube 26. When liquid samples or reagents need to be added, the extension pipe 26 with the interface 25 can be entered into a near end of the valve 241, then open the valve 241. After the filling operation, the valve 241 can be closed, and the extension tube 26 with the interface 25 can be pulled out from the near end of the valve 241 so as to avoid overflow of liquid samples or reagents.

Figure 6A:
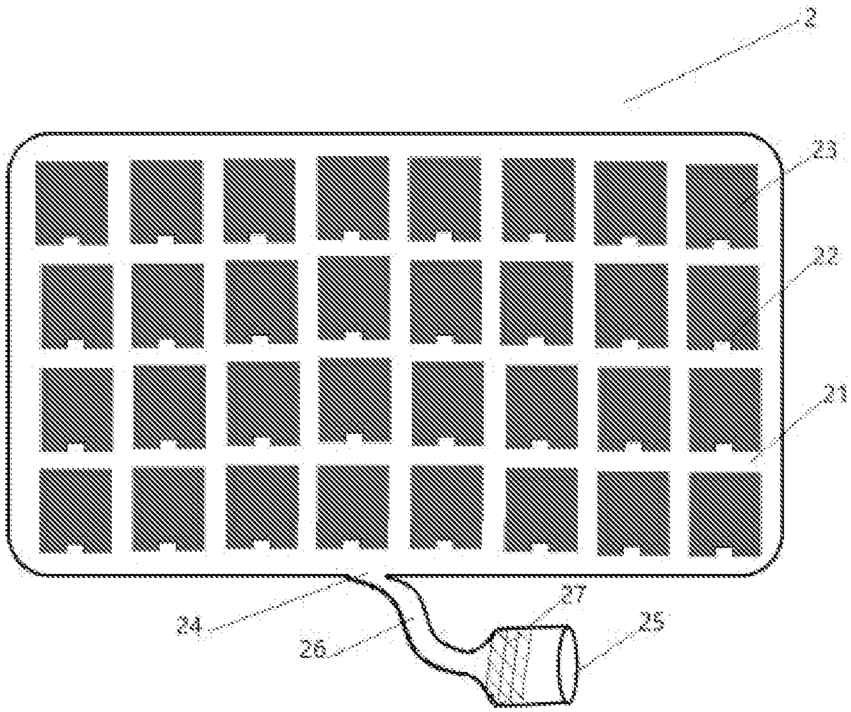
FIG. 6A is a structural diagram of a microfluidic pipe including a sample hole, an extension tube and a filter screen according to the above preferred embodiment of the present invention.
Figure 6B:
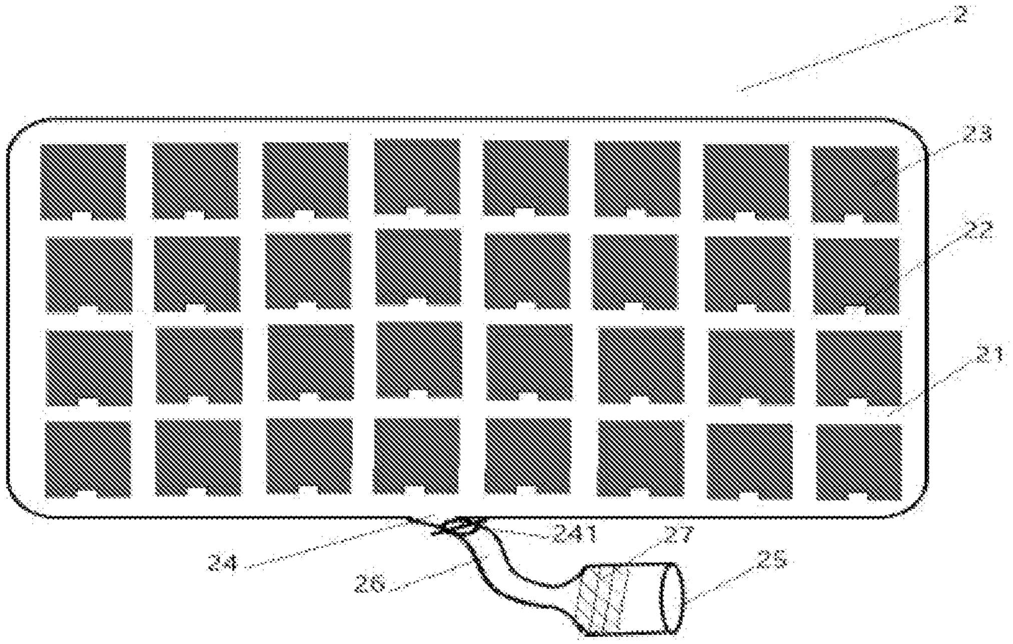
FIG. 6B is a structural diagram of a microfluidic pipe including a sample hole, an extension tube, a filter screen and a valve according to the above preferred embodiment of the present invention.

As shown in FIG. 6A, according to the preferred embodiment of the present invention, a microfluidic pipe 2 can comprise a capillary network 21, a plurality of first ports 24, a plurality of grooves 23, a plurality of second ports 22, an interface 25, an extension tube 26, and a filter screen 27. The filter screen 27 can be arranged between the interface 25 and the extension tube 26 to filter large particle components in liquid samples or reagents. A proximal end of the extension tube 26 can be fixedly connected with the interface 25, and a far end of the extension tube 26 can be pluggable connected with the first port 24. In addition, as shown in FIG. 6B, another microfluidic pipe 2 in the preferred embodiment of the present invention can comprise a capillary network 21, a plurality of first ports 24, a plurality of grooves 23, a plurality of second ports 22, an interface 25, an extension tube 26, and a valve 241. The valve 241 can be arranged at a near end of the first port 24, the valve 241 can be fixedly connected with the first port 24, the valve 241 can be pluggable connected with the extension pipe 26, and the valve 241 can be configured to avoid overflow of liquid samples or reagents filled.

Figure 7A:
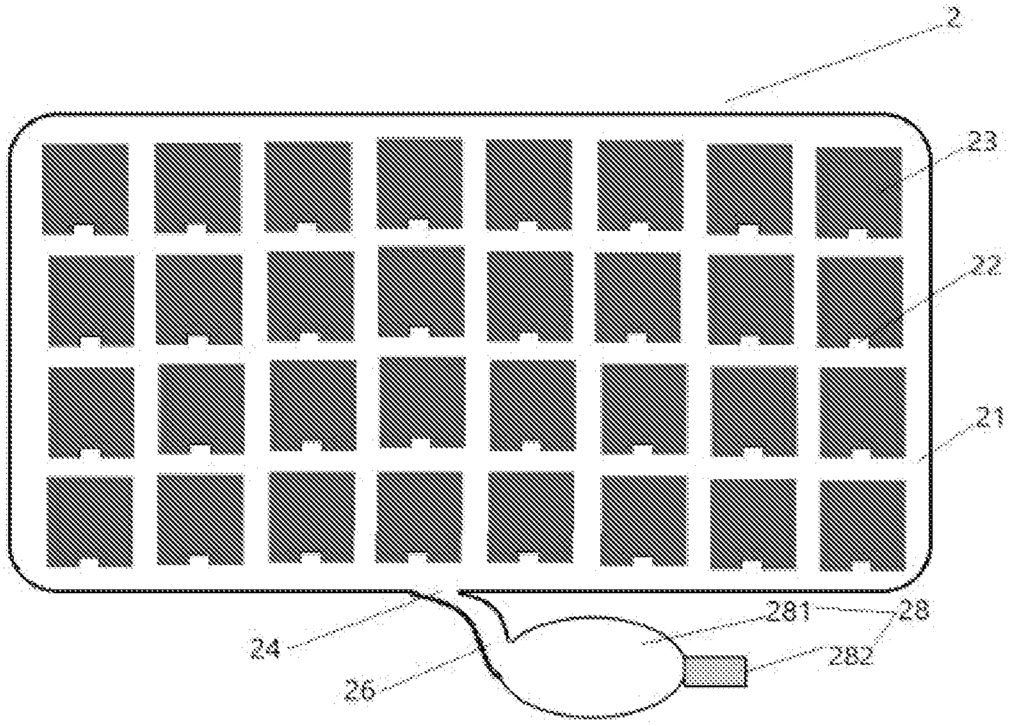
FIG. 7A is a structural diagram of a microfluidic pipe including a sample hole, an extension tube and an elastic fluid reservoir according to the above preferred embodiment of the present invention.
Figure 7B:
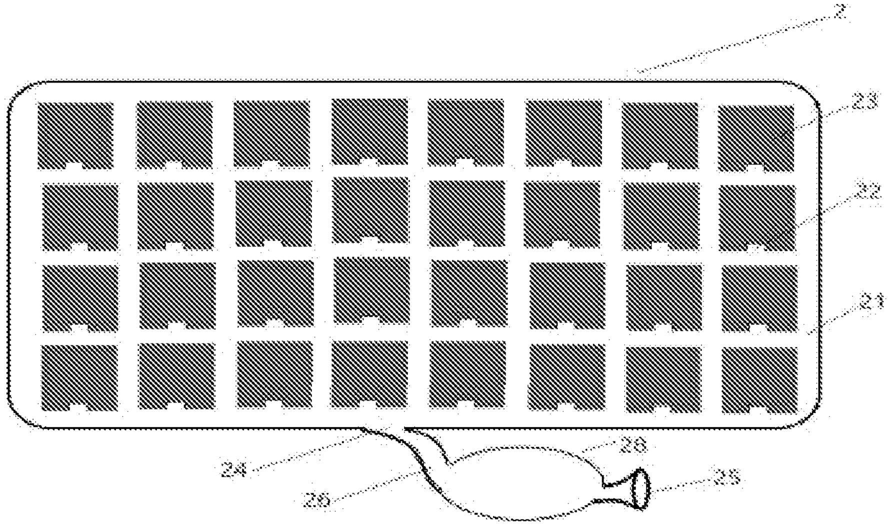
FIG. 7B is a structural diagram of a microfluidic pipe including a sample hole, an extension tube, an elastic fluid reservoir and a syringe interface according to the above preferred embodiment of the present invention.

As shown in FIG. 7A, according to the preferred embodiment of the present invention, the microfluidic pipe 2 can include a capillary network 21, a plurality of first ports 24, a plurality of grooves 23, a plurality of second ports 22, an extension tube 26, and an elastic fluid reservoir 28, wherein the elastic fluid reservoir 28 can be connected with the extension tube 26, the extension pipe 26 can be pluggable connected with the first port 24. The elastic fluid reservoir 28 can comprise a capsule body 281, an injection kettle 282. The liquid sample or reagent to be injected can be loaded into a syringe, then a needle of the syringe injects into the capsule body 281 through the injection kettle 282, after an injection, the needle of the syringe can be pulled out, the liquid sample or reagent can be slowly and continuously injected into the capillary network 21 under an elastic retraction force of the capsule 281. It should be noted that a volume, elasticity and material of the capsule body 281 of the elastic fluid reservoir 28 can be set as required, and a shape and size of the injection kettle 282 can be set as required. As shown in FIG. 7B, another microfluidic pipe 2 in the preferred embodiment of the present invention can comprise a capillary network 21, a plurality of first ports 24, a plurality of grooves 23, a plurality of second ports 22, an extension tube 26, an elastic fluid reservoir 28, and an interface 25. The elastic fluid reservoir 28 can include a capsule body 281, and the interface 25 can be directly connected to a syringe. It should be noted that a cell lysate can be pre coated in the elastic fluid reservoir 28 as required for a detection of samples that may contain blood or tissue components, such as urine, gastric juice, fecal filtrate, etc.

Figure 8:
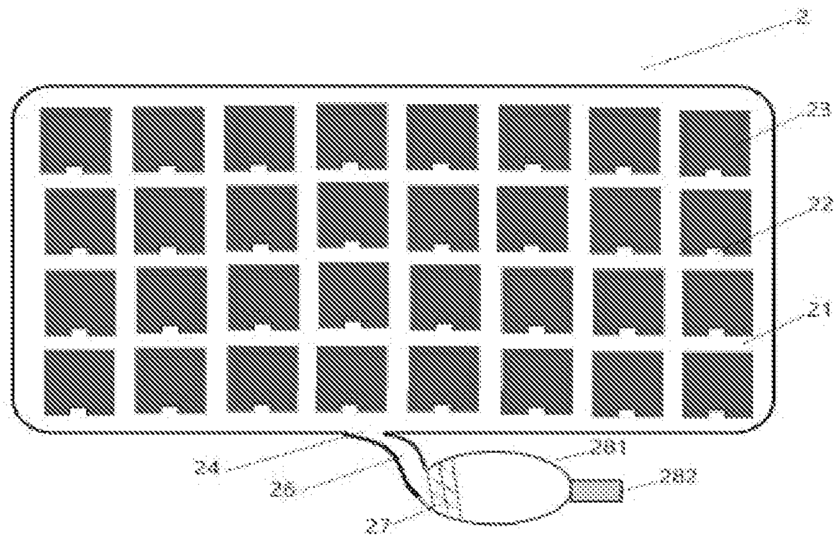
FIG. 8 is a structural diagram of a microfluidic pipe including a sample hole, an extension tube, an elastic fluid reservoir and a filter screen according to the above preferred embodiment of the present invention.

As shown in FIG. 8, according to the preferred embodiment of the present invention, the microfluidic pipe 2 can comprise a capillary network 21, a plurality of first ports 24, a plurality of grooves 23, a plurality of second ports 22, an extension tube 26, an elastic fluid reservoir 28, and a filter screen 27, wherein the elastic fluid reservoir 28 can be connected with the extension tube 26, the extension tube 26 can pluggable connected with the first port 24. The elastic fluid reservoir 28 can comprise a capsule body 281, an injection kettle 282. The filter screen 27 can be arranged at a tail end of the elastic fluid reservoir 28, connected with the extension tube 26, so that a liquid sample or reagent to be filled can be pierced into the injection kettle 282 by a syringe needle and injected into the capsule body 281, and then the liquid sample or reagent can be slowly and continuously injected into the capillary network 21 under an elastic retraction force of the capsule body 281, and the filter screen 27 can filter large particle components to prevent the large particle components from entering the capillary network 21. It should be noted that the injection kettle 282 can be replaced by the interface 25 and can be directly connected to the syringe.

Figure 9A:
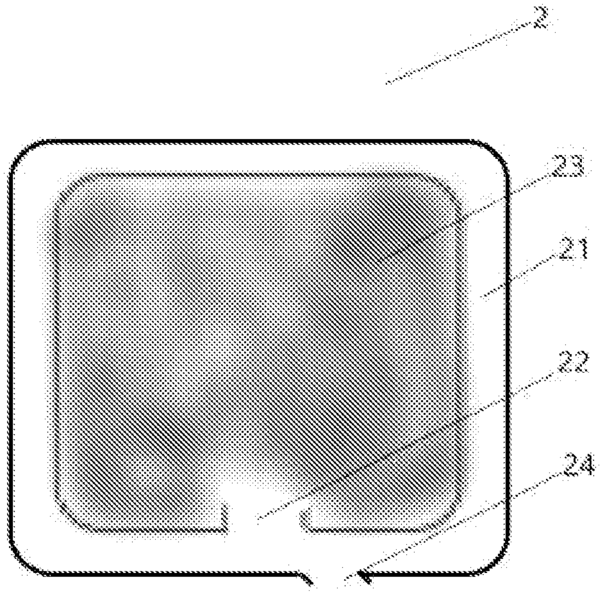
FIG. 9A is a structural diagram of a groove unit according to the above preferred embodiment of the present invention.
Figure 9B:
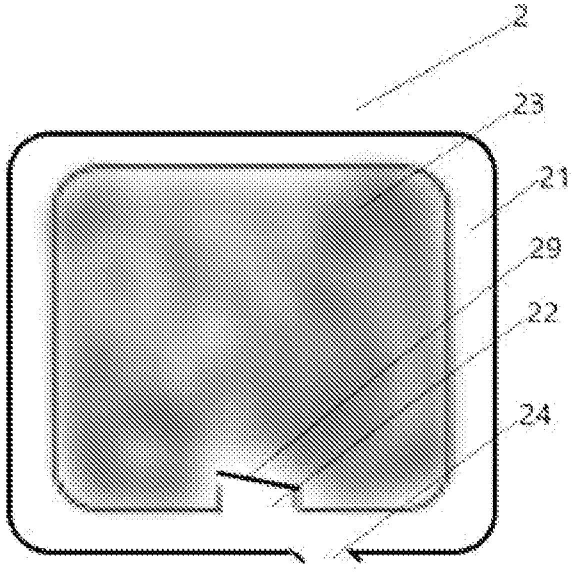
FIG. 9B is another structural diagram of a groove unit according to the above preferred embodiment of the present invention.

As shown in FIG. 9A, according to the preferred embodiment of the present invention, the groove 23 can comprise a plurality of walls of a capillary network 21, a first port 24, and a second port 22, wherein the walls of the capillary network 21 can form a fence of the groove 23, and liquid samples or reagents can enter the capillary network 21 through the first port 24, and then enter the groove 23 through the second port 22. In addition, as shown in FIG. 9B, the groove 23 of another microfluidic pipe 2 in the preferred embodiment of the present invention can include a plurality of walls of a capillary network 21, a first port 24, a second port 22, and a micro valve 29, wherein the walls of the capillary network 21 can form a fence of the groove 23, the micro valve 29 can be a one-way valve, and liquid samples or reagents can enter the capillary network 21 through the first port 24, and enter the groove 23 through the second port 22 and the micro valve 29, moreover, the micro valve 29 can prevent the samples or reagents in the groove 23 from flowing back into the capillary network 21.

Figure 10A:
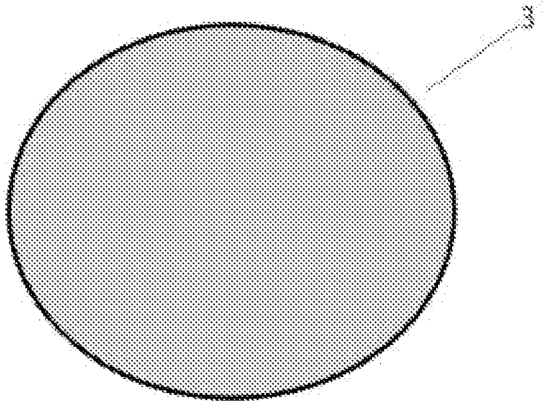
FIG. 10A is a structural diagram of a reagent block according to the above preferred embodiment of the present invention.
Figure 10B:
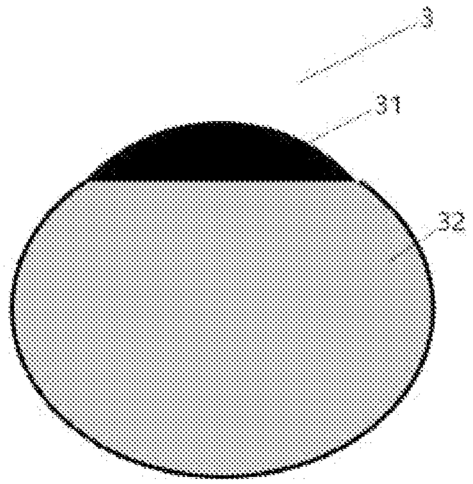
FIG. 10B is a structural diagram of a second reagent block according to the above preferred embodiment of the present invention.
Figure 10C:
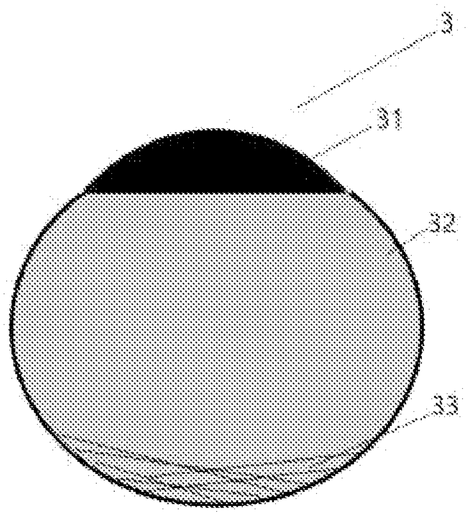
FIG. 10C is a structural diagram of a third reagent block according to the above preferred embodiment of the present invention.

As shown in FIG. 10A, according to the preferred embodiment of the present invention, a reagent block 3 can be in a disc structure. Types of the reagent block 3 include but are not limited to dry chemical detection reagent blocks, immunological detection reagent blocks, and chip reagent blocks. The reagent block 3 can include single item detection reagent combinations and multi item detection reagent combinations. In addition, as shown in FIG. 10B, another reagent block 3 in the preferred embodiment of the present invention can comprise a reaction part 32 and a waste liquid absorbent part 31, wherein the reaction part 32 is configured to implement a color reaction, and the waste liquid absorbent part 31 is configured to excess liquid samples, reagents or waste liquid in a color reaction process. In addition, as shown in FIG. 10C, another reagent block 3 of the preferred embodiment of the present invention can comprise a reaction part 32, a waste liquid absorbent part 31, and a filter membrane part 33, wherein the filter membrane part 33 can be arranged between the reaction part 32 and a second port 22 to filter large particle components. It can be understood that the reagent block 3 can be a dry test paper block absorbing the color reaction reagent, a semi dry test paper block or a gel block absorbing the color reaction reagent, or a detection unit composed of one or more micro chambers precoated with the color reaction reagent.

Figure 11A:
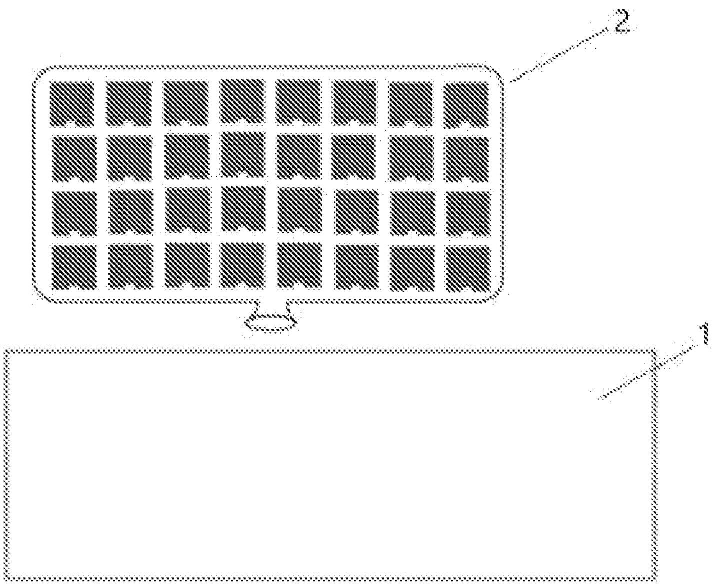
FIG. 11A is a schematic diagram of a separation structure of a microfluidic pipe and a substrate according to the above preferred embodiment of the present invention.
Figure 11B:
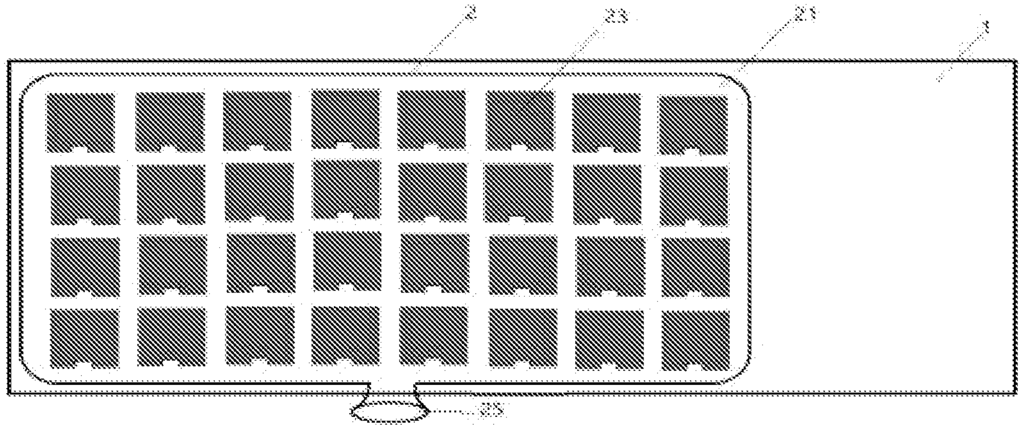
FIG. 11B is a schematic diagram of a first combination structure of a microfluidic pipe and a substrate according to the above preferred embodiment of the present invention.
Figure 11C:
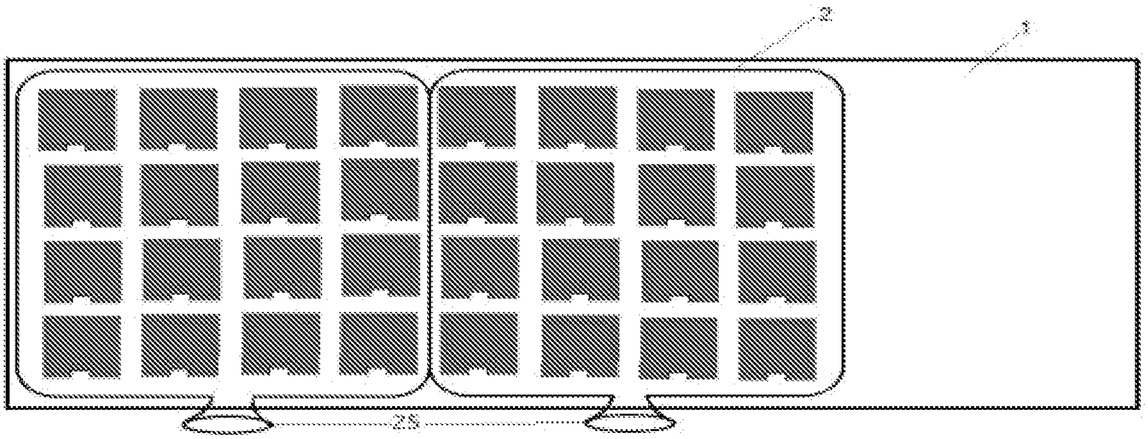
FIG. 11C is a schematic diagram of a second combination structure of a microfluidic pipe and a substrate according to the above preferred embodiment of the present invention.
Figure 11D:
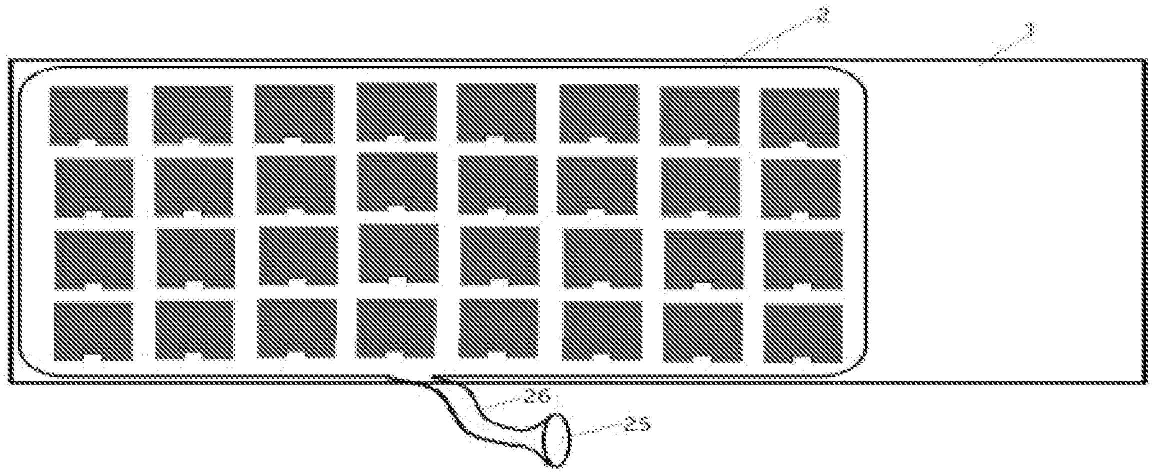
FIG. 11D is a schematic diagram of a third combination structure of a microfluidic pipe and a substrate according to the above preferred embodiment of the present invention.
Figure 11E:
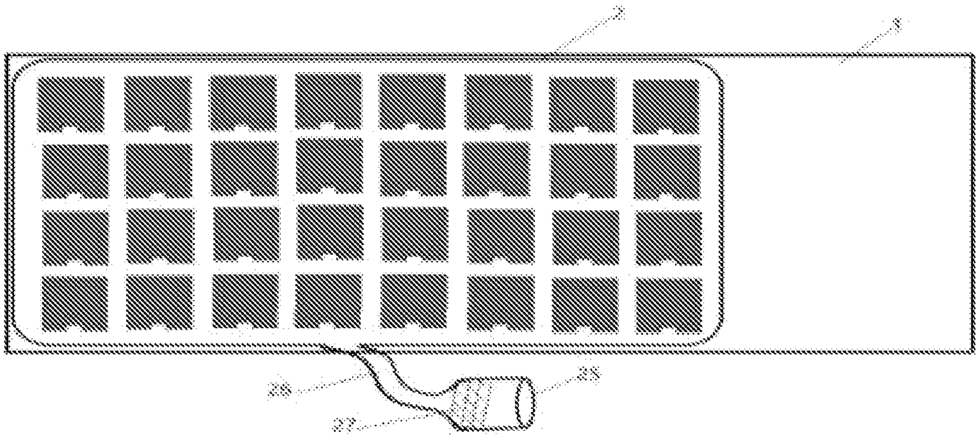
FIG. 11E is a schematic diagram of a forth combination structure of a microfluidic pipe and a substrate according to the above preferred embodiment of the present invention.
Figure 11F:
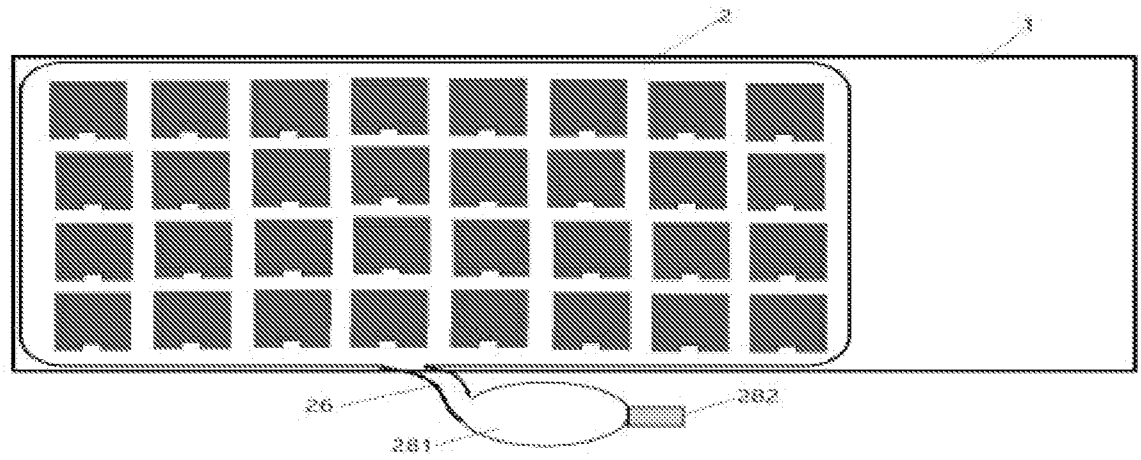
FIG. 11F is a schematic diagram of a fifth combination structure of a microfluidic pipe and a substrate according to the above preferred embodiment of the present invention.
Figure 11G:
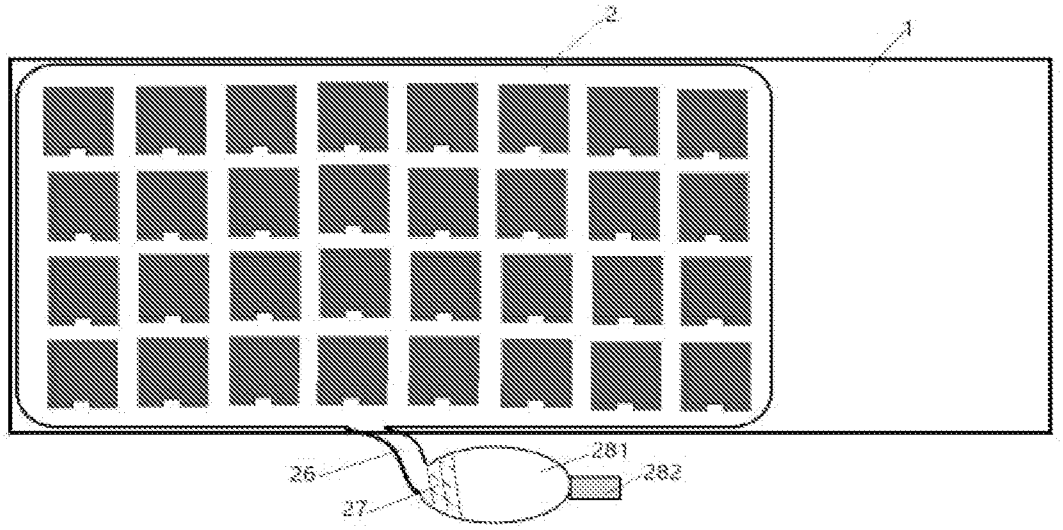
FIG. 11G is a schematic diagram of a sixth combination structure of a microfluidic pipe and a substrate according to the above preferred embodiment of the present invention.

As shown in FIG. 11A, the substrate 1 according to the preferred embodiment of the present invention can be bonded with a microfluidic pipe 2 to obtain a substrate 1 microfluidic pipe 2 assembly as shown in FIG. 11B, wherein the substrate 1 and the microfluidic pipe 2 need to match each other in size, shape and material, and pipe walls of a capillary network 21 combined with a substrate provided by the substrate 1 can form a groove 23. An interface 25 is usually arranged at a side edge of the substrate 1 microfluidic pipe 2 assembly to facilitate injection operation. In addition, the substrate 1 can be bonded with different types of microfluidic pipes 2 to form different types of substrate 1 microfluidic pipe 2 assemblies to meet needs. For example, a substrate 1 microfluidic pipe 2 assembly as shown in FIG. 11C can comprise a substrate 1 and two sets of microfluidic pipe 2 systems, or a substrate 1 microfluidic pipe 2 assembly as shown in FIG. 11D can comprise a substrate 1 and a microfluidic pipe 2 with an extension tube 26, or a substrate 1 microfluidic pipe 2 assembly as shown in FIG. 11E can comprise a substrate 1 and a microfluidic pipe 2 with an extension tube 26 and a filter screen 27, or a substrate 1 microfluidic pipe 2 assembly as shown in FIG. 11F can comprise a substrate 1, a microfluidic pipe 2, an extension tube 26, a capsule body 281, and an injection kettle 282, or a substrate 1 microfluidic pipe 2 assembly as shown in FIG. 11G can comprise a substrate 1, a microfluidic pipe 2, an extension tube 26, a filter screen 27, a capsule body 281, and an injection kettle 282.

Figure 11H:
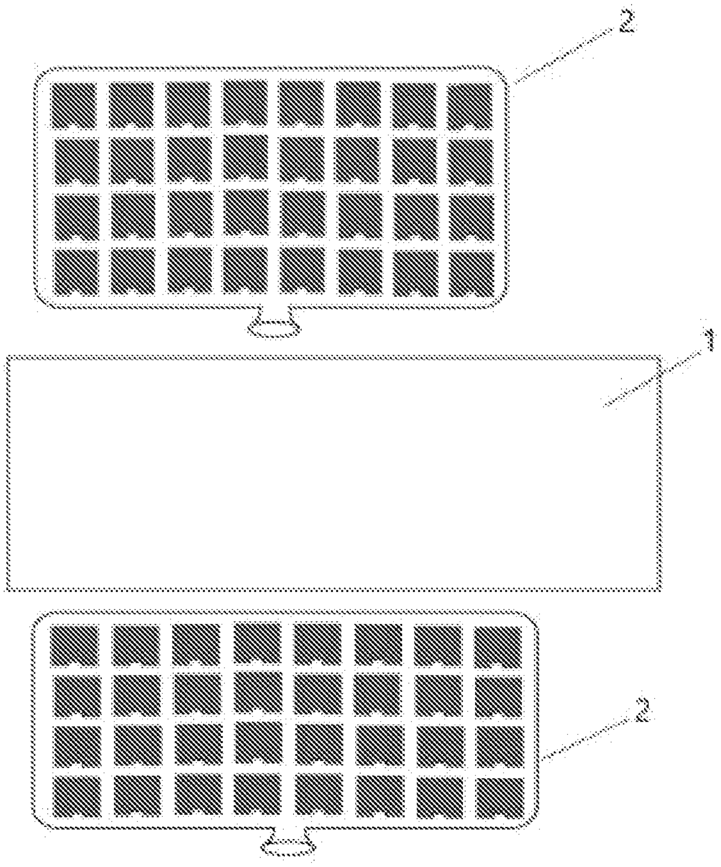
FIG. 11H is a schematic diagram of another separation structure of a microfluidic pipe and a substrate according to the above preferred embodiment of the present invention.

In addition, as shown in FIG. 11H, a substrate according to the preferred embodiment of the present invention can be bonded with two microfluidic pipes 2 as a substrate 1 microfluidic pipes 2 assembly, wherein the substrate 1 and the two microfluidic pipes 2 need to match each other in size, shape and material, and the two microfluidic pipes 2 can be respectively bonded on a front and back of the substrate 1, so as to achieve an effect of increasing a number of a groove 23. It should be noted that types of the two microfluidic pipes 2 can be a same or different.

Figure 12:
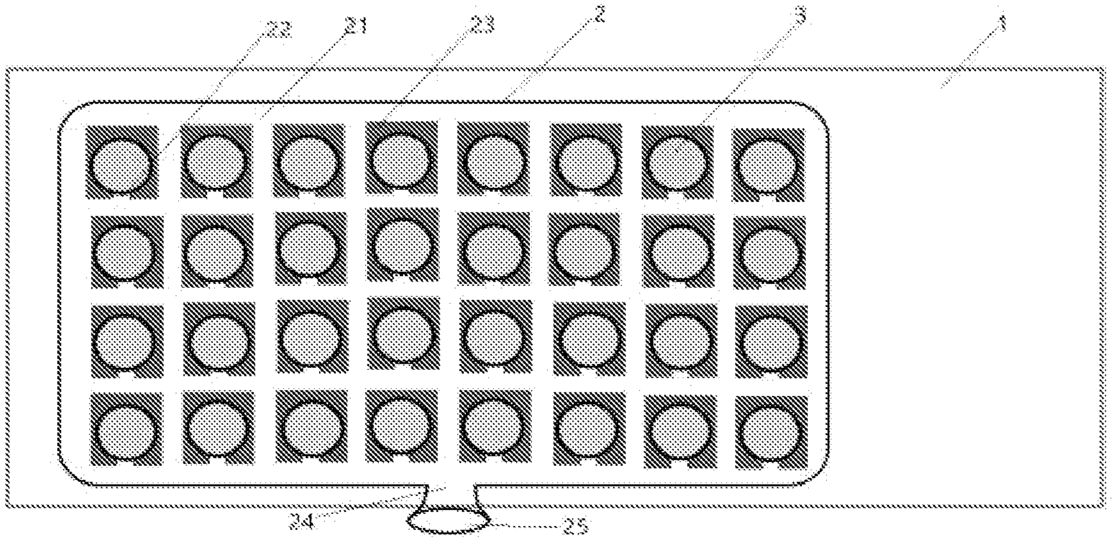
FIG. 12 is a structural diagram of a microfluidic detection strip chip including a microfluidic pipe, a substrate and a plurality of reagent blocks according to the above preferred embodiment of the present invention.

As shown in FIG. 12, the microfluidic detection strip chip of the preferred embodiment of the present invention can comprise a substrate 1, a microfluidic pipe 2, and a plurality of reagent blocks 3, wherein the reagent blocks 3 can be printed into a lattice arranged grooves 23. A syringe can be connected to an interface 25, liquid sample or reagent in the syringe can be pushed into a capillary network 21 through a first port 24, flow in the capillary network 21, and enter the groove 23 through a second port 22. A waste liquid absorbent part 31 of the reagent block 3 in the groove 23 can attract liquid samples or reagents to infiltrate a reaction part 32 of the reagent block 3, then the reaction part 32 can be fully absorbed, a capillary absorption operation of the waste liquid absorbent part 31 can be weaken or disappear, and then liquid sample or reagent infiltration end.

It should be noted that the lattice arranged grooves 23 of the microfluidic detection strip chip in the preferred embodiment of the present invention can be divided into a plurality of areas according to a distance between the groove 23 and the first port 24. Similarly, the reagent blocks 3 can be divided into a plurality of categories based on a target molecular weight of indicators detected by the reagent blocks 3. If the molecular weight of the indicator detected by the reagent block 3 is large, the reagent block 3 can be set in the groove 23 in the area near the first port 24. On the contrary, if the molecular weight of the indicator detected by reagent block 3 is small, the reagent block 3 can be set in the groove 23 in the area far from the first port 24. Thus, depending on a laminar flow effect of the microfluidic pipe 2, different target molecules in liquid samples can enter into different types of the reagent blocks 3 almost at the same time, reducing a detection time, provide detection efficiency.

It should be noted that an amount of liquid sample or reagent required for the microfluidic strip chip in the preferred embodiment of the present invention can be accurately designed and obtained by actual testing, so as to provide a reference for users.

It should be noted that the reagent blocks 3 of the microfluidic strip chip in the preferred embodiment of the present invention can also be divided into a plurality of categories according to different principles of chromogenic reaction. The reagent blocks 3 with same or similar principle can be set in a same area, and a same set of microfluidic pipes 2 can be set in the area to facilitate users to fill liquid samples or reagents.

Figure 13:
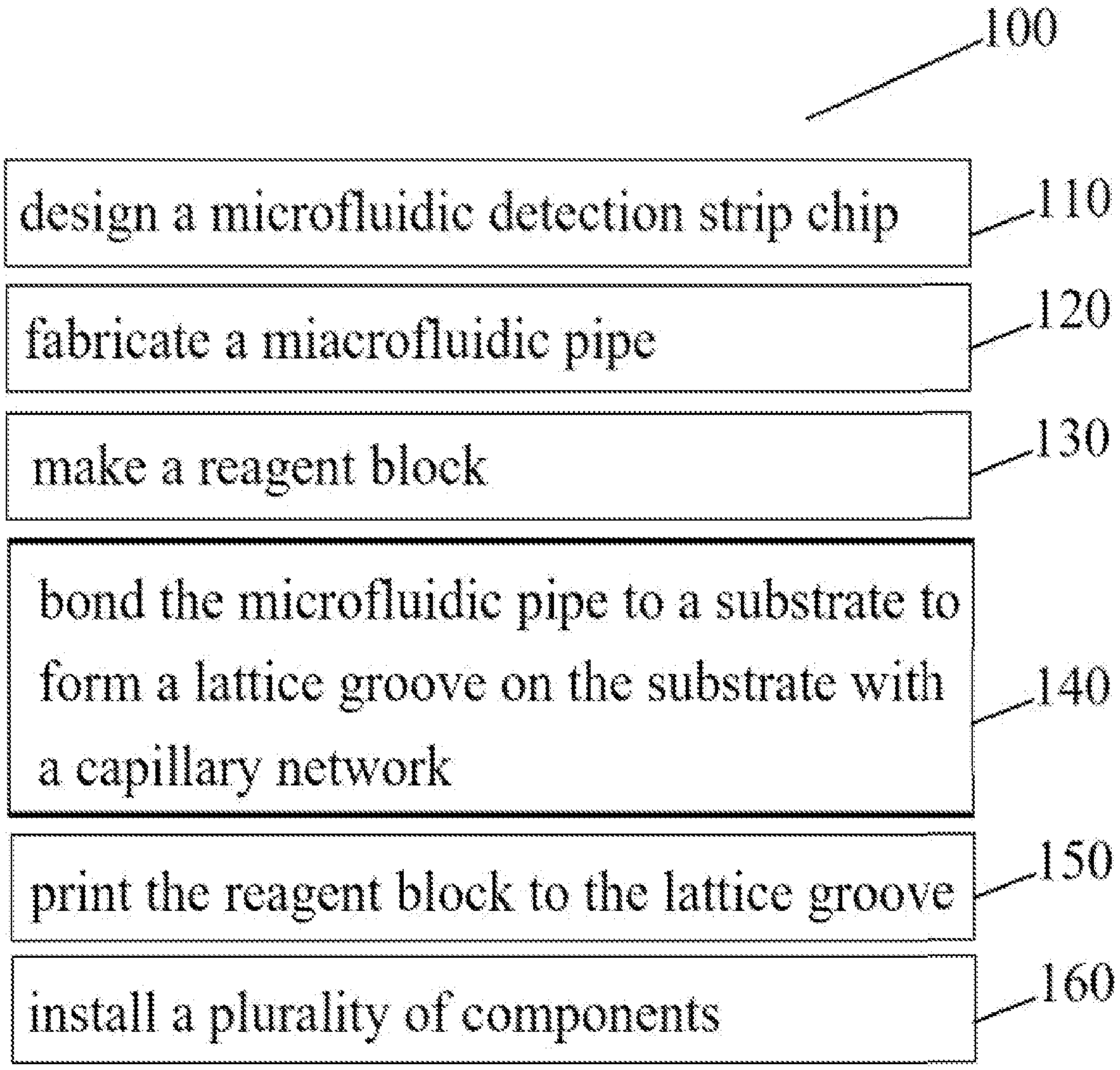
FIG. 13 is a preparation process chart of a microfluidic detection strip chip according to the above preferred embodiment of the present invention.

Referring to FIG. 13, according to the preferred embodiment of the present invention, a process 100 of a microfluidic detection strip chip preparation comprises the following steps.

S110: Design a microfluidic detection strip chip, including a microfluidic pipe, a substrate, and a plurality of reagent blocks.

First of all, determine a detection item category, indictors and performance index of the microfluidic detection test strip chip to meet user needs.

With an assistant of design software, a circuit diagram of the microfluidic pipe can be drawn. The circuit diagram of the microfluidic pipe at least includes one capillary network, a plurality of first ports, a plurality of grooves, a plurality of second ports, and at least one interfaces, and can also include at least one extension tube, one or more filters, and one or more elastic fluid reservoirs.

Among them, a plurality of groove areas can be divided according to a distance between the groove and the first port. Similarly, a plurality of groove areas containing different reagent blocks can be divided according to a molecular weight of the indicator detected by the reagent block. Then the reagent block layout scheme can be determined. In addition, the reagent blocks can also be divided into a plurality of categories according to different principles of chromogenic reaction. The reagent blocks with same or similar principles of chromogenic reaction can be set in the same groove area, and the same set of microfluidic pipes can be set in the same area to facilitate users to fill liquid samples or reagents.

According to the circuit diagram of the microfluidic pipe, a substrate can be designed.

Then an amount of liquid sample or reagent required for microfluidic detection strip chip can be measured so as to provide a reference for users.

S120. Fabricate the microfluidic pipe by micro machining process. Generally, polymer materials or silicon based materials can be selected, injection molding technology, etching technology and/or 3D printing technology can be used, and 3D modeling can be conducted according to the circuit diagram of the microfluidic pipe designed in step S110 to produce the microfluidic pipe.

S130: Make the reagent blocks by micro machining process. The reagent block can be usually a disk-shaped dry test paper block or semi dry test paper block or gel block or one or more micro chambers to form a detection unit. The types of reagent blocks can comprise a dry chemical detection reagent block, an immunological detection reagent block and a chip reagent block.

S140: Bond the microfluidic pipe to the substrate to form a lattice grooves on the substrate with a capillary network. The microfluidic pipe made in step S120 can be combined with the substrate by bonding or thermal bonding. One substrate can combine one or more microfluidic pipes on one side, and one substrate can also combine two or more microfluidic pipes on the front and back. It can be understood that if 3D printing technology is used to make microfluidic pipes, 3D printing technology can be used to make microfluidic pipes and substrate complexes.

S150: Print the reagent blocks to the lattice grooves on the substrate which can be implemented using a prior art (patent publication No. CN112362648A). It should be noted that a semi dry reagent block, gel reagent block or liquid reagent block can be covered with a micro cover plate or film.

S160: Install a plurality of components, including an interface, an extension tube, a valve, an elastic fluid reservoir and/or a filter screen, print identification codes in a blank area of the substrate, make a complete microfluidic detection strip chip, and put it into a packaging box.

Figure 14:
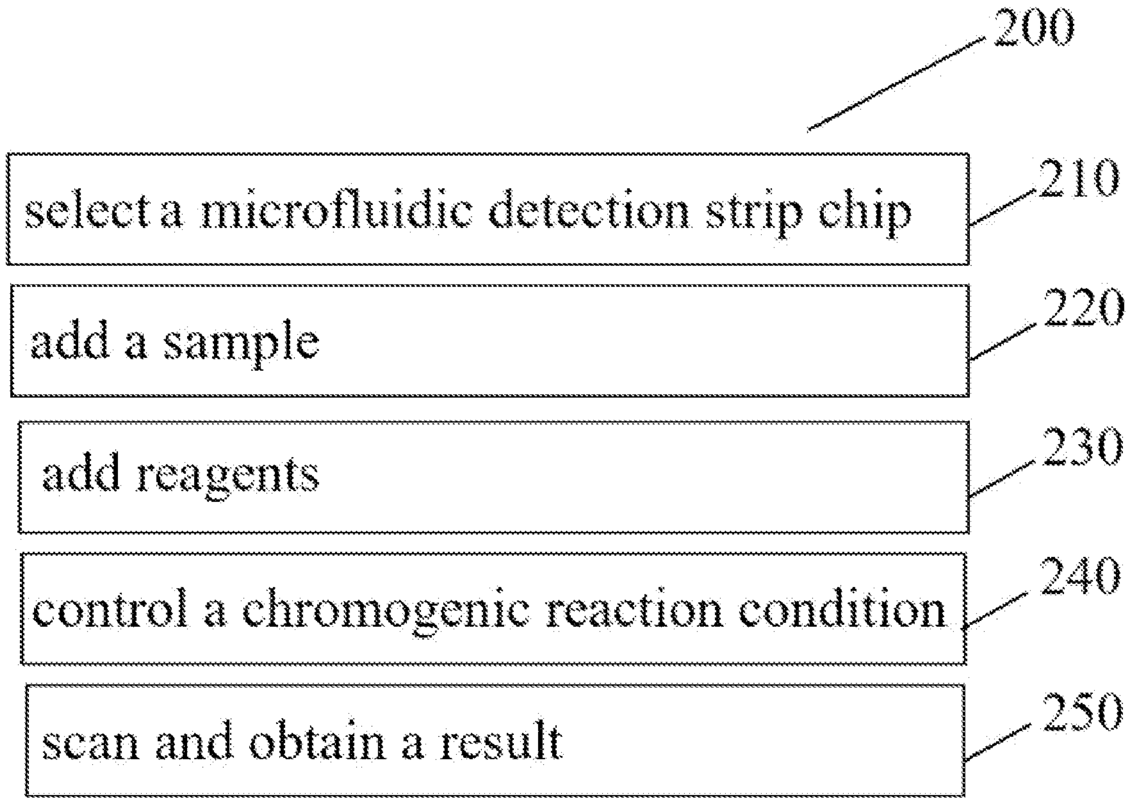
FIG. 14 is a usage process chart of a microfluidic detection strip chip according to the above preferred embodiment of the present invention.

As shown in FIG. 14, a usage process 200 of a microfluidic detection strip chip according to the preferred embodiment of the present invention comprises the following steps.

S210: Select a microfluidic detection strip chip. According to a sample type and detection purpose, the microfluidic detection strip chip or a combination of several microfluidic detection strip chips can be selected.

S220: Add samples. A process of adding samples can include a plurality of steps as fellow: (a) connect a sample adding component to the microfluidic detection strip chip, such as an interface, an extension tube, an filter screen, an elastic fluid reservoir, (b) absorb liquid samples with a syringe, (c) connect the syringe with the interface, and (d) push the syringe to add samples into the microfluidic detection strip chip. If the sample is a solid or semi-solid material, such as dry or molded feces, dried blood or urine residue, it can be needed to dissolve the solid or semi-solid material with normal saline or pure water, and then use the syringe to suck the sample, connect the interface, and fill the sample into the microfluidic detection strip chip. It should be noted that a minimum amount of liquid sample should be needed according to the microfluidic detection strip chip, so as to ensure that each reagent block of the microfluidic detection strip chip can be fully soaked. If the amount of liquid sample is not insufficient, and then the liquid sample can be diluted in an appropriate proportion to reach the minimum amount marked on the microfluidic detection strip chip.

S230: Add reagents. According to an instruction for the microfluidic detection strip chip, before or after adding samples, absorb a certain amount of a reagent or a plurality of reagents or a combination of a plurality of reagents with a syringe, connect the interface of the microfluidic detection strip chip, and add the reagents.

S240: Control a chromogenic reaction condition. According to the instructions of the microfluidic detection strip chip, provide a suitable temperature and humidity environment, remove a micro cover plate or film covering the reagent block, and leave an appropriate reaction time.

S250: Scan and obtain a result. After the chromogenic reaction in step S240 completed, scan the microfluidic detection strip chip with a vision sensor under an appropriate light condition to obtain a chromogenic reaction data of each reagent block, and then obtain a detection result of multiple indicators in the sample with an algorithm.

The above description is only an example of the application, and does not limit the technical scope of the application. Therefore, any minor modification, equivalent change and modification of the above embodiments according to the technical essence of the application still fall within the scope of the technical solution of the application. Professionals should be aware that professionals can use different methods to achieve the described functions for each specific application, but such implementation should not be considered beyond the scope of this application.

What is claimed is:

1. A microfluidic detection strip chip for multiple indicator detection of a micro sample, including:

a substrate, a microfluidic pipe configured to control a flow speed and direction of the micro sample and reagents and participate in forming a groove, wherein the microfluidic pipe is bonded to a surface of the substrate, and a plurality of reagent blocks configured to absorb the micro sample and the reagents and perform chromogenic reaction, wherein each of the plurality of reagent blocks is arranged in the groove;

wherein the substrate is configured to carry the microfluidic pipe and the reagent blocks which forms the microfluidic detection strip chip;

wherein the microfluidic pipe comprises two or more independent pipeline systems configured to detect multiple indicators of the micro sample;

wherein the microfluidic pipe comprises a first port, a capillary network, a second port, and a sample adding component, wherein the first port is connected with the capillary network, wherein the capillary network is connected with the second port and the groove is connected with the capillary network through the second port;

wherein the sample adding component is configured to add the micro sample and the reagents and the sample adding component is connected with the first port;

wherein the sample adding component comprises a sample hole, which comprises a first interface;

wherein the sample adding component further comprises an extension tube, which is connected with the first interface and the first port configured to increase a convenience of the micro sample being filled;

wherein the sample adding component further comprises a reagent hole, wherein the reagent hole comprises a second interface and a second extension tube, wherein the first interface and the second interface are configured to selectively connected with at least one syringe, wherein the first interface is configured to connect the at least one syringe for filling the micro sample, wherein the second extension tube is connected to the second interface and the first port is configured to connect the at least one syringe for adding the reagents.

2. The microfluidic detection strip chip according to claim 1, wherein the sample adding component further comprises an elastic fluid reservoir configured to store the micro sample and the reagents, and slowly and continuously inject the micro inject sample and the reagents into the capillary network through the first port.

3. The microfluidic detection strip chip according to claim 2, wherein the elastic fluid reservoir comprises an injection kettle, a capsule body and a valve, wherein the injection kettle is connected with the capsule body configured to connect a syringe needle of the at least one syringe, and the capsule body is pluggable connected with the first port through the valve.

4. A microfluidic detection strip chip for multiple indicator detection of a micro sample, including:

a substrate, a microfluidic pipe configured to control a flow speed and direction of the micro sample and reagents and participate in forming a plurality of grooves, wherein the microfluidic pipe is bonded to a surface of the substrate, and a plurality of reagent blocks configured to absorb the micro sample and the reagents and perform a chromogenic reaction, wherein the plurality of grooves is arranged in a lattice to accommodate the plurality of reagent blocks;

wherein each of the reagent blocks comprises a reaction part and a waste liquid absorbent part, wherein the reaction part is configured to provide the chromogenic reaction between the micro sample and the reagents and the waste liquid absorbent part is configured to absorb the micro sample and the reagents;

wherein each of the reagent blocks further comprises a filter membrane part, wherein the filter membrane part is arranged between the reaction part and a second port configured to filter a large particle component in the micro sample.

5. The microfluidic detection strip chip according to claim 4, wherein one of the reagent blocks is arranged in one groove located closer to a first port than another groove of the plurality of grooves to detect an indicator of the micro sample having a larger target molecular weight.

6. The microfluidic detection strip chip according to claim 5, wherein another of the reagent blocks is arranged in the other groove of the plurality of grooves that is located farther from the first port to detect an indicator of the micro sample having a smaller target molecular weight.

* * * * *